United States Patent [19]

Yamada

[11] 4,388,653
[45] Jun. 14, 1983

[54] METHOD FOR CONTROLLING WRITING TIMINGS OF PICTURE SIGNALS TO BE STORED IN A MEMORY

[75] Inventor: Mitsuhiko Yamada, Kyoto, Japan

[73] Assignee: Dainippon Screen Seizo Kabushiki Kaisha, Kyoto, Japan

[21] Appl. No.: 181,633

[22] Filed: Aug. 26, 1980

[30] Foreign Application Priority Data

Aug. 28, 1979 [JP] Japan ............................ 54-108692

[51] Int. Cl.³ .............................................. H04N 1/22
[52] U.S. Cl. .................................... 358/302; 358/296
[58] Field of Search ............ 358/296, 302, 267, 264, 358/78, 77, 75, 127, 138; 318/311

[56] References Cited

U.S. PATENT DOCUMENTS

| | | | |
|---|---|---|---|
| 3,541,245 | 11/1970 | Wilby | 358/77 |
| 3,678,497 | 7/1972 | Watson | 178/30 |
| 3,878,559 | 4/1975 | Pugsley | 358/75 |
| 3,889,057 | 6/1975 | Perreault | 358/267 |
| 3,944,726 | 3/1976 | Ito | 358/78 |
| 3,975,761 | 8/1976 | Taudt | 358/78 |
| 3,991,868 | 11/1976 | Robinson | 178/30 |
| 4,012,584 | 3/1977 | Gascoigne | 358/302 |
| 4,075,663 | 2/1978 | Wellendorf | 358/283 |
| 4,107,786 | 8/1978 | Masaki | 364/900 |
| 4,129,860 | 12/1978 | Yonezawa | 178/30 |
| 4,135,212 | 1/1979 | Pugsley | 358/256 |
| 4,191,975 | 3/1980 | White | 358/264 |

FOREIGN PATENT DOCUMENTS

54-65601 5/1979 Japan ................................ 358/296

Primary Examiner—Alan Faber
Attorney, Agent, or Firm—Marvin E. Jacobs

[57] ABSTRACT

A method for controlling writing timings of picture signals to be stored in a memory, for use in a picture reproducing machine wherein the picture signals picked up by picture scanning means are stored in the memory and then the picture signals are read out of the memory, and wherein reproduction pictures are recorded on a recording film by a reproduction recording means by using the picture signals read out. The picture signals are latched consecutively into latch circuits arranged before the memory by a first clock pulse generated by the picture scanning means, and then the picture signals read out of the latch circuits in the latching order by a second clock pulse generated by the reproduction recording means are written into the memory.

5 Claims, 6 Drawing Figures

METHOD FOR CONTROLLING WRITING TIMINGS OF PICTURE SIGNALS TO BE STORED IN A MEMORY

BACKGROUND OF THE INVENTION

This invention relates to a method for controlling writing timings of picture signals to be stored in a memory, picked up by picture scanning means, for use in a picture reproducing machine such as a color scanner and a color facsimile.

A picture reproducing machine such as a color scanner for plate-making, or the like, having a buffer memory between a picture scanning means and a reproduction recording means, which controls reproduction scales and layout positions of reproduction pictures, has been proposed. In this case, in order to minimize the capacity required of such a buffer memory, picture and recording cylinders are rotated at the same speed, and each writing or reading operation of a picture signal is carried out one by one in a sampling interval, but, when the reproduction scale is changed at a certain value, several writing or reading operations are conducted in the sampling interval.

This sampling interval corresponds to the interval of picture elements, which determines the analytical power of the picture scanning means and the reproduction recording means. In the color scanner for plate-making, the analytical power required is very high, and thus the sampling interval is quite short.

The picture and the recording cylinders are controlled accurately so as to be revolved at the same speed. However, a very small amount of inequality in the rotation of the cylinders due to various mechanical errors is inevitable. Accordingly, the very small amount of relative speed variations of the cylinders do occur, and, in practice, it is impossible to adjust every starting position per one rotation of the scannings with an accuracy more than the analytical power of the picture signals.

Hence, the writing and the reading of the picture signal in a single sampling interval may be performed by using a clock pulse which is synchronous with either the picture scanning means or the reproduction recording means, but by using this clock pulse, as mentioned above, when the relative speed variations of the cylinders occur, the reproduction pictures are deformed largely rather than depending on the accuracy of each picture scanning or reproduction recording means.

In order to avoid the deformation of the reproduction picture, the writing should be carried out by a clock pulse which is synchronous with the picture scanning means and the reading should be carried out by a clock pulse which is synchronous with the reproduction recording means. However, the accesses of the writing and the reading in the memory are not always carried out in the same time. Accordingly, by the partial relative speed variation of the cylinders or the disorder of the starting positions of the scannings the phase of the clock pulses for writing and reading are shifted irregularly, and thus the timings of the writing and the reading clock pulses are overlapped, with the result of the deformation of the reproduction picture by the lack of the picture element, and so forth.

Further, the phases of the writing and the reading clock pulses are in proportion to the rotation speeds of the picture and the recording cylinders, and, if the speeds of the two cylinders synchronized two clock pulses having the same phase are obtained. Hence, the phase variations of the two clock pulses by the rotation inequalities, and the like, causes a beat.

This kind of beat is a zero beat, or the like, having a long frequency, and therefore, if the timings of the two clock pulses overlap each other, such a condition will continue for a relatively long time, resulting in a large scale of deformation of the reproduction picture.

In a conventional layout scanner, in which a plurality of original pictures are reproduced on a recording film according to the desired layout, a plurality of picture scanning means and a reproduction recording means are arranged in parallel, and a buffer memory is connected therebetween, wherein the picture signals obtained by the picture scanning means are stored into the memory, and then by reading out the picture signals consecutively of the memory the reproduction pictures are reproduced in the desired layout positions by the reproduction recording means. In this embodiment, since the plurality of picture scanning means are driven in parallel, there is less time to control the writing timings of the picture signals and thus it is rather difficult to do it.

SUMMARY OF THE INVENTION

Therefore, it is an object of the present invention to provide a method for controlling writing timings of picture signals to be stored in a memory, picked up by picture scanning means, for use in a picture reproducing machine, free from the above described disadvantages, which is capable of reproducing exact reproduction pictures, and prevents the reproduction pictures from being deformed, and which is stable and reliable.

According to the present invention there is provided a method for controlling writing timings of picture signals to be stored in a memory, for use in a picture reproducing machine wherein the picture signals picked up by picture scanning means are stored in the memory and then the picture signals are read out of the memory, and wherein reproduction pictures are recorded on a recording film by a reproduction recording means by using the picture signals read out, comprising the steps of (a) latching the picture signals consecutively into latch circuits arranged prior to the memory by a first clock pulse generated by the picture scanning means, and (b) writing into the memory the picture signals read out of the latch circuits in the latching order by a second clock pulse generaged by the reproduction recording means.

BRIEF DESCRIPTION OF DRAWINGS

In order that the present invention may be better understood, preferred embodiments will be described with reference to the accompanying drawings, in which.

DESCRIPTION OF PREFERRED EMBODIMENTS

Figure 1:
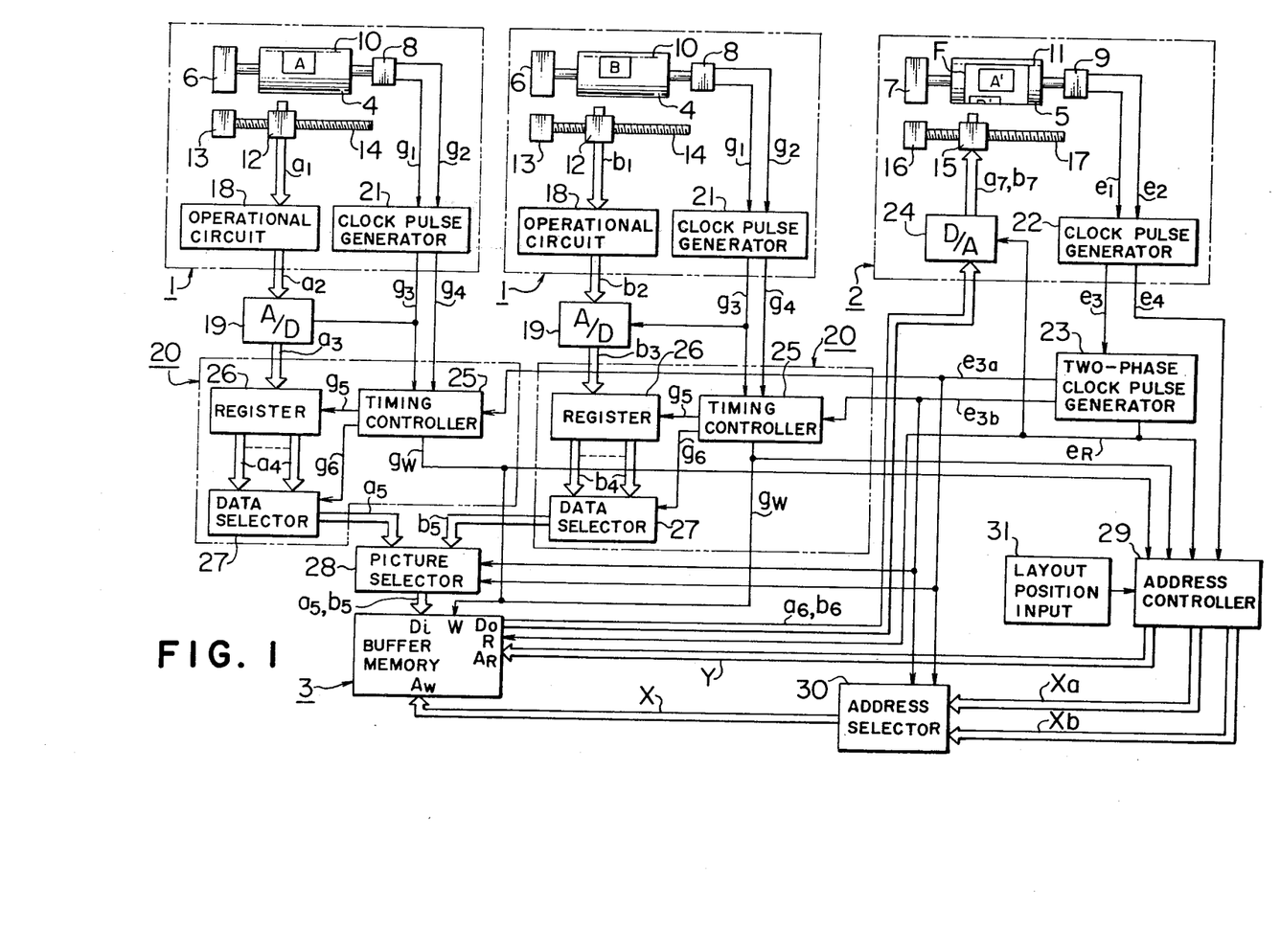
FIG. 1 is a block diagram of a layout color scanner which is capable of performing a method according to the present invention.

Referring now to the drawings there is shown in FIG. 1 a layout scanner which is capable of performing a method according to the present invention, comprising two picture scanning means 1 of the same type, a reproduction recording means 2, and a one block of buffer memory 3 arranged therebetween.

Picture cylinders 4 of the picture scanning means 1 and a recording cylinder 5 having the same diameter as the picture cylinders 4, of the reproduction recording means 2 are driven at the same speed by synchronous motors 6 and 7. The rotation speeds of the cylinders 4 and 5 and standard positions 10 and 11 formed on the cylinders 4 and 5 are detected in the form of electric pulse signals by rotary encoders 8 and 9 which are coaxially disposed to the cylinders 4 and 5.

A pickup head 12 of each picture scanning means 1 is moved in the direction of the cylinder's axis along a screw rod 14 by a motor 13 such as a pulse motor. A recording head 15 of the recording means 2 is moved in the direction of the cylinder's axis along a screw rod 17 by a motor 16.

Each picture scanning means 1 is provided with an operational circuit 18 which operates color control conditions such as a masking, a color correction, a detail emphasis, and so forth, of analog picture signals $a_1$ or $b_1$ obtained by scanning an original picture A or B photoelectrically by the pickup head 12. The operational circuit 18 outputs an analog picture signal $a_2$ or $b_2$ operated to an analog-digital converter 19, hereinafter referred to as an A/D converter, in which the signal $a_2$ or $b_2$ is converted into a digital picture signal $a_3$ or $b_3$. The operational circuit 18 may be positioned after the A/D converter 19 and in such a case, it should be a digital circuit. The digital picture signal $a_3$ or $b_3$ is sent to a writing timing control circuit 20 comprising a timing controller 25, a register 26, and a data selector 27.

The rotary encoder 8 or 9 generates a plurality of timing pulses $g_1$ or $e_1$ and a start pulse $g_2$ or $e_2$ in the standard position 10 or 11 per one rotation of the cylinder 4 or 5, which are sent to a clock pulse generator 21 or 22. The clock pulse generator 21 or 22 increases the frequency of the timing pulse $g_1$ or $e_1$ by a phase-lock loop circuit, or the like, to output a clock pulse $g_3$ or $e_3$.

When the rotation speeds of the cylinders 4 and 5 are the same, the clock pulses $g_3$ and $e_3$ are adjusted to the same phase, but the clock pulse generators 21 and 22 are not synchronized one another. The clock pulse generator 21 or 22 reforms the wave-shape of the start pulse $g_2$ or $e_2$ into a start pulse $g_4$ or $e_4$ having the same extent of accuracy as the analytical power of the clock pulse $g_3$ or $e_3$.

Figure 2:
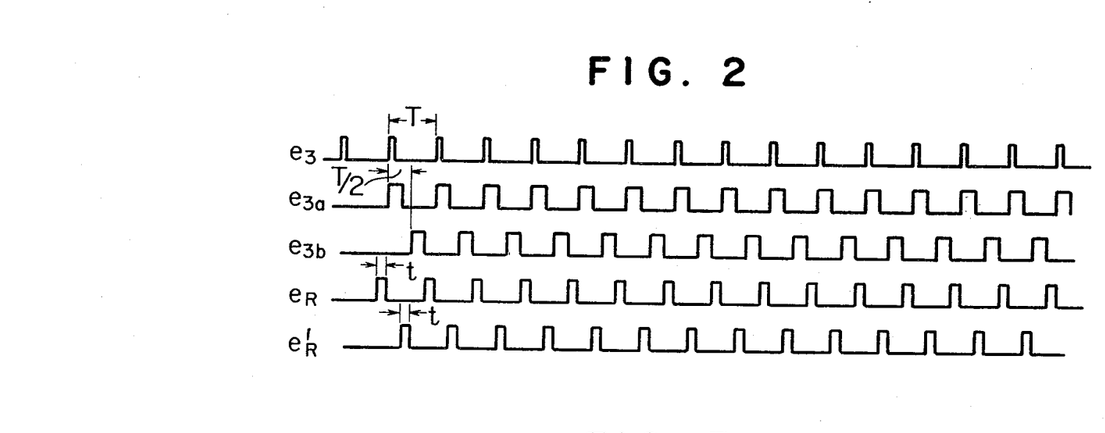
FIG. 2 is a time chart showing a relation between writing and reading clock pulses shown in FIG. 1.

The clock pulse $e_3$ is sent to a two-phase clock pulse generator 23 and is divided there into a pair of two-phase writing clock pulses $e_{3a}$ and $e_{3b}$ having the same period as that of the clock pulse $e_3$ and a duty-cycle of less than 50% of a high level pulse width. Each of the two-phase clock pulses $e_{3a}$ and $e_{3b}$ has a phase difference 180° from the other's. From the two-phase clock pulses $e_{3a}$ and $e_{3b}$ a pair of two-phase reading clock pulses $e_R$ and $e_R'$ are prepared. Each two-phase clock pulse $e_R$ or $e_R'$ is raised to the high level before that of the two-phase clock pulse $e_{3a}$ or $e_{3b}$, as shown in FIG. 2.

In this embodiment, one of the two-phase clock pulses $e_R$ and $e_R'$ is required. For example, the clock pulse $e_R$ is sent to a digital-analog converter 24, hereinafter referred to as a D/A converter, of the recording means 2, and the reading order input terminal of the memory 3.

The two-phase writing clock pulses $e_{3a}$ and $e_{3b}$ are sent to the writing timing control circuits 20 for controlling the timings of the writing of the picture signals $a_3$ and $b_3$ into the memory 3.

In the writing timing control circuit 20, the timing controller 25 compares the phase difference between the clock pulse $g_3$ for determining the sampling time of the A/D converter 19 and the clock pulse $e_{3a}$ or $e_{3b}$ for determining the writing timing of the memory 3 and the pulse numbers of the clock pulses $g_3$ and $e_{3a}$ or $e_{3b}$ per a certain time, and outputs a writing pulse gw whose timing is not overlapped to that of the reading timing of the memory 3, to the writing order input terminal of the memory 3.

The picture signals $a_3$ or $b_3$ are registered in the register 26 in series in synchronization with a signal $g_5$ generated by the timing controller 25. The register 26 outputs a group of picture signals $a_4$ or $b_4$ in parallel, to the data selector 27. The data selector 27 rearranges the picture signals $a_4$ or $b_4$ arranged in parallel, to the regular serial order of picture signals $a_5$ or $b_5$ by a select signal $g_6$ generated by the timing controller 25 so as to maintain the orders of the picture signals $a_3$ or $b_3$ by eliminating the overlap of the writing and the reading timings in the memory 3, and sends the picture signals $a_5$ or $b_5$ to a picture selector 28 for laying out the recording pictures.

Either picture signal $a_5$ or $b_5$ is fed selectively and alternately from the picture selector 28 to the data input terminal of the memory 3 in the basic period T by using the two-phase clock pulses $e_{3a}$ and $e_{3b}$. The basic period T means the basic sampling or recording timing period which is predetermined in the clock pulse generators 21 and 22 and is to be controlled to a fixed value macroscopically.

A writing address signal X and a reading address signal Y are fed from an address controller 29. The writing address signal X is divided into address signals Xa and Xb for the original pictures A and B, and is output from the address controller 29 as an address number predetermined to be recorded depending on the writing pulse gw generated by the timing controller 25 for each original picture A or B.

The address signals Xa and Xb are alternately fed to the memory is synchronization with the writing timings for the original pictures A and B by an address selector 30 which is controlled by the two-phase clock pulses $e_{3a}$ and $e_{3b}$.

The reading address signal Y is synchronized with the scanning position of the recording means 2 and possesses an address addressed in order of the addresses of the memory 3 by the address controller 29. The reading address signal Y reads the picture signal $a_6$ or $b_6$ for the original picture A or B out of the memory 3 to the D/A converter 24 in synchronization with the reading clock pulse $e_R$.

The address controller 29 is connected to a layout position input means 31 which inputs the recording positions of the original pictures A and B, that is, the coordinates of the four corners of the reproduction pictures A' and B' to be recorded on a recording film F mounted to the recording cylinder 5, as the address numbers to the address controller.

The address numbers in the four corners of the reproduction pictures A' or B' are controlled by the address controller 29 so as to correspond to the writing start and end points of the picture signals $a_5$ or $b_5$.

When the recording head 15 is positioned in the recording position for the original picture A or B, the picture signal $a_6$ or $b_6$ read out of the memory 3 is converted into an analog picture signal $a_7$ or $b_7$ in the D/A converter 24, which is fed to the recording head 15. Thus, the recording head 15 records the reproduction picture A' or B' in the desired layout position on the recording film F by means of the analog picture signal $a_7$ or $b_7$.

If the reproduction pictures A' and B' are recorded with different reproduction scales from the original pictures A and B, for instance, the addresses of the picture signals stored in the memory 3 are repeatedly read out or are partly skipped, as disclosed in Japanese Patent Laying-Open Specification No. 54-65601 U.S. patent application Ser. No. 110,127, filed on July 8, 1980, by the same applicant assignee as the present invention.

Figure 3:
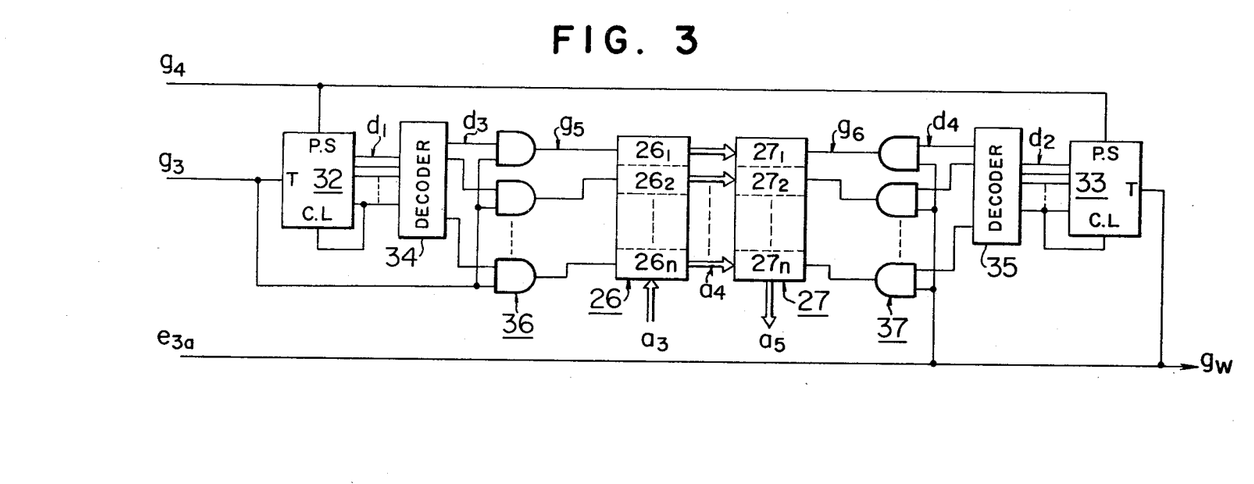
FIG. 3 is a schematic view of one embodiment of a writing timing control circuit shown in FIG. 1.

In FIG. 3 there is shown one embodiment of the writing timing control circuit 20 in FIG. 1, which performs a method according to the present invention.

The timing controller 25 comprises a pair of base n binary-code counters 32 and 33, a pair of base n decoders 34 and 35 which convert counted codes $d_1$ and $d_2$ in the counters 32 and 33 into base n alternative signals $d_3$ and $d_4$, and two groups of n AND gates 36 and 37 for the alternative signals $d_3$ and $d_4$.

The clock pulses $g_3$ and $e_{3a}$ are fed to calculation input terminals T of the counters 32 and 33, respectively, and the start pulse $g_4$ is input to preset or initial terminals P.S of the counters 32 and 33 so as to carry out the initial set of the counters 32 and 33.

The clock pulse $g_3$ is commonly fed to the AND gates 36, and the decoder 34 selects one of the AND gates through which the clock pulse $g_3$ can pass. The clock pulse $e_{3a}$ is commonly fed to the AND gates 37, and the decoder 35 selects one of the AND gates through which the clock pulse $e_{3a}$ can pass.

The output signal from the AND gates 36, corresponding to the signal $g_5$ in FIG. 1, is fed to the register 26. The output signal from the AND gates 37, corresponding to the select signal $g_6$ in FIG. 1, is fed to the data selector 27. The register 26 comprising n latch circuits $26_1$-$26_n$ is capable of holding n signals in the same time, each signal being written in or read out of the register 26 independently. When each of the AND gates 36 passes the signal $g_5$, the corresponding latch circuit of the register 26 holds the picture signal $a_3$. In this case, when the new signal is latched in the latch circuit, the previous signal is cleared. The latch circuits $26_1$-$26_n$, while they hold the signals, are sending all the signals latched therein to the data selector 27, in parallel.

The data selector 27 comprises n data switch circuits $27_1$-$27_n$ which correspond to the latch circuits $26_1$-$26_n$ and the n AND gates 37. When each of the AND gates 37 passes the signal $g_6$, the corresponding data switch circuit is opened so as to pass the picture signal $a_4$ latched in the corresponding latch circuit as the picture signal $a_5$ to the picture selector 28.

The start pulse $g_4$ presets the counter 32 with a count number n/2 and the counter 33 with a count number 0 before starting the scanning. Then, the counters 32 and 33 count firstly the clock pulses $g_3$ and $e_{3a}$ with the count numbers (n/2+1) and 1, respectively. The count number of the counter 32 counts ahead of n/2 numbers as compared with the counter 33.

Accordingly, until the data selector 27 passes the signal latched in the register 26 according to the count number counted in the counter 32, viz., the count number in the counter 33 comes up with that in the counter 32, there is sufficient time that the counter 33 can count n/2 clock pulses $e_{3a}$ to spare. This means that each of the latch circuits $26_1$-$26_n$ can hold the signal of n/2 numbers ahead as well as the signal now required for processing.

Consequently, if the recording cylinder 5 rotates faster than the normal speed, i.e. the relative counting speed of the counter 33 becomes faster than that of the counter 32, until the count numbers of the counters 32 and 33 become the same, the writing timing of the picture signal in the memory 3 does not fall into disorder.

Further, by blanking the first half latch circuits $26_1$-$26_{n/2}$, that is starting the storing of the picture signals into the latch circuits from the (n/2+1) number, if the relative counting speed of the counter 33 becomes slower than that of the counter 32, until the count numbers of the counters 32 and 33 become the same at one-cycle delay of the counter 33, the register can hold the signals of n/2 numbers ahead to be processed, and thus the writing timing of the picture signal in the memory 3 does not fall into disorder.

In the embodiment shown in FIG. 3, the clock pulse $e_{3a}$ is used as the writing pulse gw.

From the above description, it is readily understood that, assuming that the total numbers of the picture signals $a_3$ and $a_5$ written in the register 26 and read out of the data selector 27 by the clock pulses $g_3$ and $e_{3a}$ from the time which the start pulse $g_4$ is started, to a certain time are $D_1$ and $D_2$, when the relative difference between $D_1$ and $D_2$ is smaller than n/2, i.e. $|D_1-D_2| < n/2$, the writing timing of the picture signal in the memory 3 does not fall into disorder.

In this case, the total signal numbers $D_1$ and $D_2$ depend on the signal numbers corresponding to the one rotation of the cylinders 4 and 5, and the effective scanning length in the direction of the cylinder's periphery, determined according to the sizes of the original pictures A and B, and the relative difference between $|D_1-D_2|$, depends on the difference between the relative rotation speeds of the cylinders 4 and 5, that is, the frequency difference between the clock pulses $g_3$ and $e_{3a}$. Hence, the maximum difference $|D_1-D_2|_{max}$ between $D_1$ and $D_2$ per one scanning period in the direction of the cylinder's periphery may be estimated by the accuracies of the rotation speeds of the motors 6 and 7.

In order to minimize such a relative speed deviation, that is, the maximum difference $|D_1-D_2|_{max}$, an automatic speed adjusting means may be arranged between the motors 6 and 7, as hereinafter described with reference to FIG. 6. However, even if the automatic speed adjusting means is provided, in practice, it is almost impossible to remove the relative speed deviation with an accuracy required for the color scanner, but it is possible to minimize sufficiently the time to spare corresponding to n/2 numbers described above.

Figure 4:
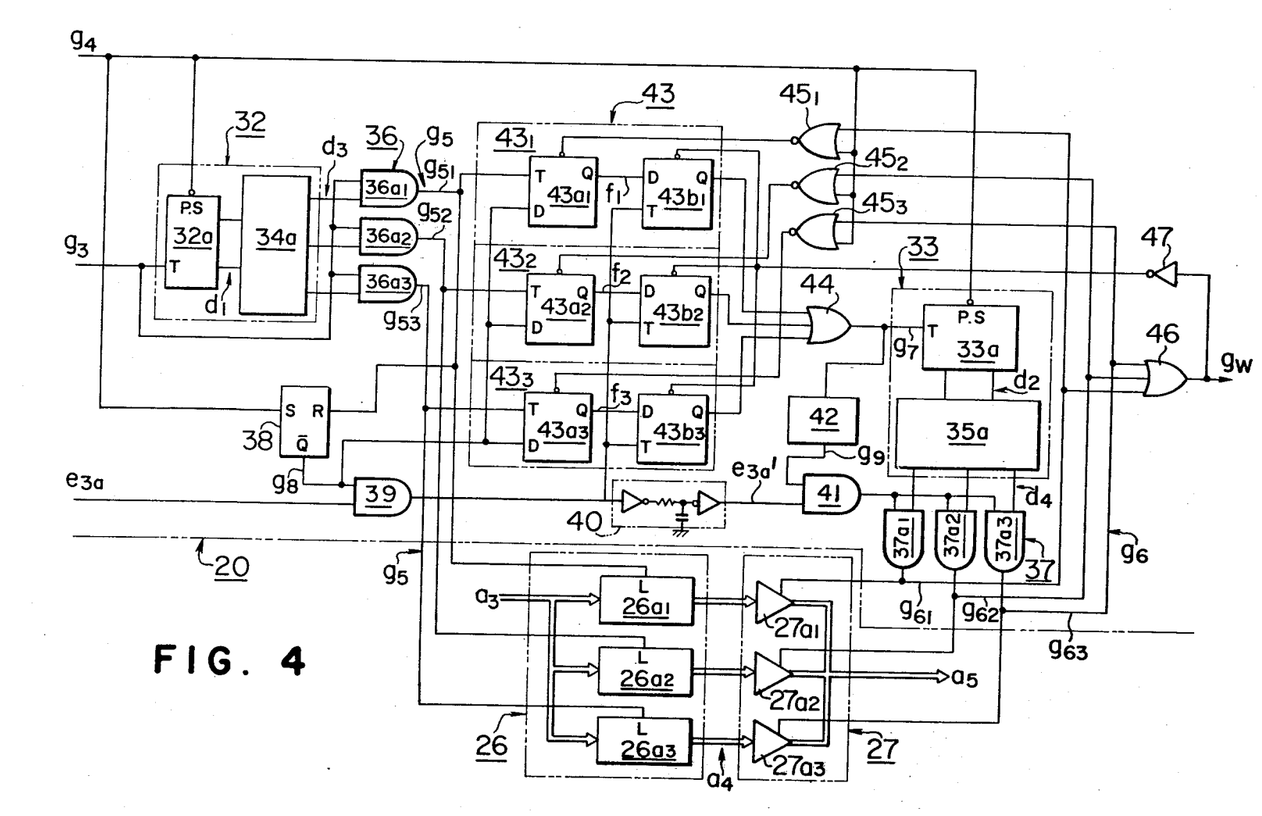
FIG. 4 is a schematic view of another embodiment of a writing timing control circuit in FIG. 1.

In FIG. 4 is shown another embodiment of the writing timing control circuit 20, that is, the number n equals three in FIG. 3 as regards the latch circuits of the register 26, the data switch circuits of the data selector 27, the AND gates 36 and 37, and so forth.

In this embodiment, ternary binary-code counters $32a$ and $33a$, ternary decoders $34a$ and $35a$, two groups of three AND gates $36a$ and $37a$, three latch circuits $26_{a1}$–$26_{a3}$ of the register 26, and three-states type bus buffers $27_{a1}$–$27_{a3}$ of the data selector 27 correspond to the base n binary-code counters 32 and 33, the base n decoders 34 and 35, the n AND gates 36 and 37, the n latch circuits $26_1$–$26_n$ of the register 26, and the data switch circuits $27_1$–$27_n$ of the data selector 27 in FIG. 3, respectively.

A count pulse $g_7$ hereinafter mentioned is input to the terminal T of the counter $33a$. The counters $32a$ and $33a$ are preset to three by the start pulse $g_4$.

The clock pulse $e_{3a}$ is commonly fed to the AND gates $37_{a1}$–$37_{a3}$ via an AND gate 39 which is opened or closed by a flip-flop circuit 38 for starting the count of the counter $32a$ before that of the counter $33a$, a delay circuit 40 which delays the clock pulse $e_{3a}$ at a time $t_1$, and an AND gate 41 which passes the clock pulse $e_{3a}$ when the count pulse $g_7$ is input to the counter $33a$.

The flip-flop circuit 38 is set by the start pulse $g_4$, and outputs a signal $g_8$ which closes the AND gate 39. The AND gate 39 is reset to be opened by an output signal $g_{51}$ from the AND gate $36_{a1}$ when the counter $32a$ counts the number one.

The AND gate 41 is opened by a signal $g_9$ which is output by a one-shot multivibrator 42 when the count signal $g_7$ is fed to the counter $33a$, and passes a clock pulse $e_{3a}'$ to the three AND gates $37_{a1}$–$37_{a3}$ when the count pulse $g_7$ is input to the counter $33a$.

The signals $G_{51}$, $g_{52}$ and $g_{53}$ output from the AND gates $36_{a1}$–$36_{a3}$ are sent to the latch circuits $26_{a1}$–$26_{a3}$, so that the latch circuit $26_{a1}$–$26_{a3}$ may latch the picture signals $a_3$, and are also sent to a pulse generator 43 which generates the count pulse $g_7$.

The pulse generator 43 comprises three queue control circuits $43_1$, $43_2$ and $43_3$ corresponding to the three latch circuits $26_{a1}$, $26_{a2}$ and $26_{a3}$. Each queue control circuit $43_1$, $43_2$ or $43_3$ comprises two D-type flip-flop circuits $43_{a1}$ and $43_{b1}$, $43_{a2}$ and $43_{b2}$, or $43_{a3}$ and $43_{b3}$, arranged in series.

For example, the queue control circuit $43_1$ is set by adding the signal $g_{51}$ output from the AND gate $36_{a1}$ to the terminal T of the first flip-flop circuit $43_{a1}$. On this occasion, the first flip-flop circuit $43_{a1}$ outputs a signal $f_1$ to the terminal D of the second flip-flop circuit $43_{b1}$, and the clock pulse $e_{3a}$ through the AND gate 39 is fed to the terminal T of the second flip-flop circuit $43_{b1}$. Only when the first flip-flop circuit $43_{a1}$ is in the set state, the output signal from the second flip-flop circuit $43_{b1}$ is inverted by the clock pulse $e_{3a}$ to raise the output signal. This output signal raised is fed to the terminal T of the counter $33a$ through an OR gate 44.

The other queue control circuits $43_2$ and $43_3$ have the same construction and function as the one $43_1$ described above, and the output signals from the second flip-flop circuits $43_{b2}$ and $43_{b3}$ are sent to the terminal T of the counter $33a$ via the OR gate 44 in the same manner as described above. To the terminals T of the first flip-flop circuits $43_{a2}$ and $43_{a3}$ are fed the output signals $g_{52}$ and $g_{53}$ from the AND gates $36_{a2}$ and $36_{a3}$, and the clock pulse $e_{3a}$ is supplied to the terminals T of the second flip-flop circuits $43_{b2}$ and $43_{b3}$.

Each of the three queue control circuits $43_1$, $43_2$ and $43_3$ and each of the three latch circuits $26_{a1}$, $26_{a2}$ and $26_{a3}$ are actuated by the signal $g_{51}$, $g_{52}$ or $g_{53}$ output from the AND gate $36_{a1}$, $36_{a2}$ or $36_{a3}$ as soon as they receive the output signal $g_{51}$, $g_{52}$ or $g_{53}$, and, in the same time, the signal latched in the latch circuit $26_{a1}$, $26_{a2}$ or $26_{a3}$ is read out of the bus buffer $27_{a1}$, $27_{a2}$ or $27_{a3}$.

Each first flip-flop circuit $43_{a1}$, $43_{a2}$ or $43_{a3}$ of the queue control circuit $43_1$, $43_2$ or $43_3$ corresponding to the latch circuit $26_{a1}$, $26_{a2}$ or $26_{a3}$ which performs the reading out by the bus buffer $27_{a1}$, $27_{a2}$ or $27_{a3}$ actuated by the signal $g_{61}$, $g_{62}$ or $g_{63}$ output from the AND gate $37_{a1}$, $37_{a2}$ or $37_{a3}$, is reset by the signal $g_{61}$, $g_{62}$ or $g_{63}$ which is sent to the first flip-flop circuit $43_{a1}$, $43_{a2}$ or $43_{a3}$ via an OR gate $45_1$, $45_2$ or $45_3$.

Each signal $g_{61}$, $g_{62}$ or $g_{63}$ output from the AND gate $37_{a1}$, $37_{a2}$ or $37_{a3}$ is sent to an OR gate 46 which outputs the writing pulse gw. The writing pulse gw is sent to the second flip-flop circuits $43_{b1}$, $43_{b2}$ and $43_{b3}$ via an inverter 47 to reset them at the same time.

Each first flip-flop circuit $43_{a1}$, $43_{a2}$ or $43_{a3}$ of the queue control circuit $43_1$, $43_2$ or $43_3$ is reset as soon as the signal latched in the corresponding latch circuit $26_{a1}$, $26_{a2}$ or $26_{a3}$ is read out. The second flip-flop circuits $43_{b1}$, $43_{b2}$ and $43_{b3}$ are all reset when one of the signals latched in the latch circuits is read out.

Figure 5:
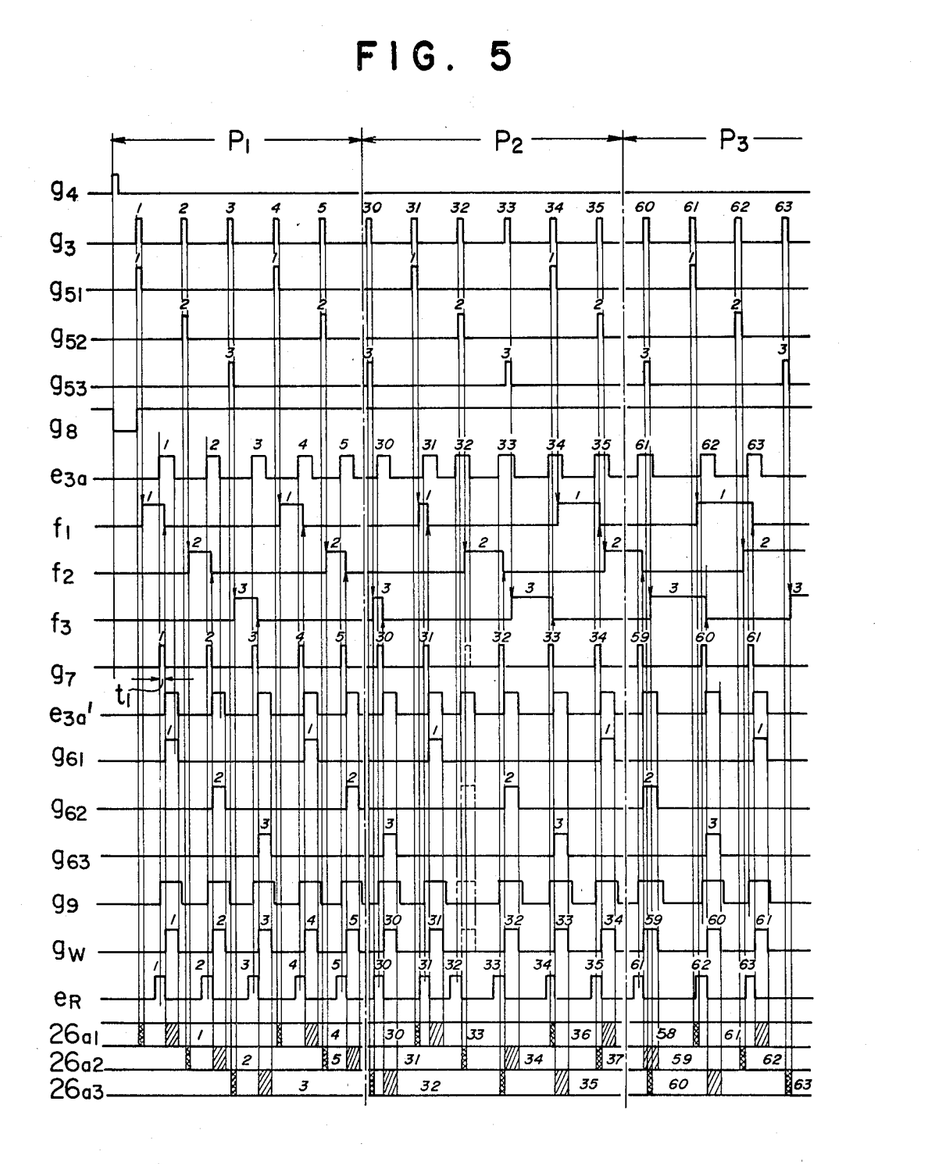
FIG. 5 is a time chart of pulse signals appeared in FIG. 4.

In FIG. 5 is shown a time chart of the pulse signals appeared in FIG. 4, in which $P_1$, $P_2$ and $P_3$ indicate a period at a starting time, a period at a time on which the count number of the clock pulses $e_{3a}$ goes forward more than that of the clock pulses $g_3$ and thus there is no signal which have never been read out of the latch circuits $26_{a1}$, $26_{a2}$ and $26_{a3}$ in any latch circuit, and a period at a time on which the count number of the clock pulses $a_{3a}$ is behind more than that of the clock pulses $g_3$ and thus there can be at least a signal which has never been read out of the latch circuit.

The going forward means the increase of the pulse numbers per the unit time, and the being behind means the decrease of the pulse numbers per the unit time.

At the starting time in the period $P_1$, before the flip-flop circuit 38 counts the first count number of the counter $32a$, the AND gate 39 is closed so as to precede the count number of the counter $32a$.

The clock pulse $e_{3a}$ is supplied to the queue control circuit $43_1$ through the AND gate opened to generate the count pulse $g_7$. The count pulse $g_7$ generated sets forward the count number of the counter $33a$, and the corresponding AND gate $37_{a1}$ opened outputs the pulse $g_{61}$ to the bus buffer $27_{a1}$. The bus buffer $27_{a1}$ opened by the pulse $g_{61}$ passes the signal latched in the latch circuit $26_{a1}$ when the counter $32a$ counts at the first time, to the memory 3. In this case, the pulse width $t_1$ of the count pulse $g_7$ corresponds to the delay time in the delay circuit 40.

In the period $P_1$, as shown in FIG. 5 in the lowermost three stairs $26_{a1}$, $26_{a2}$ and $26_{a3}$ for the three latch circuits, the latching timings which are shown by cross hatchings and include the times for clearing of the signals previously latched in their leading edges, precede the reading timings shown by hatchings, and each signal latched in the latch circuits is read out in one period $T_1$ of the clock pulse $g_3$. Therefore, no excess signals which are not read out is latched in the other latch circuits, and the newest signals latched are always read out quickly.

In the period $P_2$, the reading timings precede the latching timings. For example, the clock pulse $e_{3a}$ No. 32 is forward more than the clock pulse $g_3$ No. 32, and, in fact, the corresponding picture signal is not latched in any latch circuits $26_{a1}$, $26_{a2}$ and $26_{a3}$.

In such a case, when the pulse signals $g_{51}$–$g_{53}$ from the AND gates 36 are not sent to the first flip-flop circuits $43_{a1}$, $43_{a2}$ and $43_{a3}$, or the first flip-flop circuits $43_{a1}$, $43_{a2}$ and $43_{a3}$ do not output any signal, the clock pulse $e_{3a}$ No. 32 is fed to the second flip-flop circuits $43_{b1}$, $43_{b2}$ and $43_{b3}$, but no second flip-flop circuits $43_{b1}$, $43_{b2}$ and $43_{b3}$ can output the pulse $g_7$.

Accordingly, the counter $33a$ cannot count the count number, and the pulses $g_7$, $g_{62}$, $g_9$ and gw to be obtained by the clock pulse $e_{3a}$ No. 32 are skipped, which is equal to the skip of the clock pulse $e_{3a}$ No. 32.

On the other hand, the reading pulse $e_R$ No. 32 cannot be skipped, which means that the memory 3 is substantially operated in the reading precedence. Thus, the start of the reading out of the memory 3 may be delayed a certain time corresponding to the desired signals in advance in the same manner as the embodiment shown in FIG. 3.

The writing pulse gw No. 32 is obtained by the count pulse $g_7$ No. 32 generated by the clock pulse $e_{3a}$ No. 33 after the latch circuit $26_{a2}$ latches the picture signal No. 32 by the clock pulse $g_3$ No. 32.

In the period $P_3$, the writing timing of the clock pulse $e_{3a}$ is behind, and at least one picture signal which has never been read out is latched in any of the latch circuits $26_{a1}$, $26_{a2}$ and $26_{a3}$.

In the periods $P_1$ and $P_2$, each of the picture signals latched in the latch circuits is always read out in the one period of the clock pulse $g_3$ and no picture signal which has never been read out is latched in the latch circuits. However, in the period $P_3$, when the writing timings of the clock pulse $e_{3a}$ are consecutively behind to those of the clock pulse $g_3$, a plurality of picture signals which have never been read out, become held in the latch circuits $26_{a1}$, $26_{a2}$ and $26_{a3}$. In such a case, the picture signals latched in the latch circuits should be read out from the one earliest latched so as to maintain the order of the signals to be sent to the memory 3.

In order to remove this defects, the pulse generator 43 comprising the three queue control circuits $43_1$, $43_2$ and $43_3$ is provided.

Each first flip-flop circuit $43_{a1}$, $43_{a2}$ and $43_{a3}$ of the queue control circuit $43_1$, $43_2$ or $43_3$ is set as soon as the corresponding latch circuit $26_{a1}$, $26_{a2}$ or $26_{a3}$ latchs the picture signal, and is reset when the picture signal latched is read out. Hence, it is possible that more than one of the flip-flop circuits $43_{a1}$, $43_{a2}$ and $43_{a3}$ may be set at the same time. This situation is maintained until the picture signal latched is read out.

For example, when the clock pulse $e_{3a}$ is input, the flip-flop circuits $43_{a3}$ and $43_{a1}$ are set by the clock pulses $g_3$ Nos. 60 and 61 and the picture signals Nos. 60 and 61 are latched in the latch circuits $26_{a3}$ and $26_{a1}$. On that occasion, the counter $33a$ counts the count pulse $g_7$ No. 59, and thus the count number of the counter $33a$ is two. By the count number two the picture signal No. 59 is read out of the latch circuit $26_{a2}$.

The clock pulse $e_{3a}$ erects the outputs of the second flip-flop circuits $43_{b3}$ and $43_{b1}$ of the queue control circuits $43_3$ and $43_1$ by the leading edge of the clock pulse $e_{3a}$, and erects the count pulse $g_7$ which sets forward the count number of the counter $33a$ to three.

The clock pulse $e_{3a}'$ which passes through the AND gate 41 after the time $t_1$ from the pulse $g_7$, passes through the AND gate $37_{a3}$ which is opened by the count number three from the counter $33a$. Then, the writing pulse gw No. 60 is sent to the terminal W of the memory 3, and the picture signal No. 60 latched in the latch circuit $26_{a3}$ is read out and is sent to the memory 3 via the bus buffer $27_{a3}$.

In this case, the writing pulse gw through the AND gate $37_{a3}$ is sent to the first flip-flop circuit $43_{a3}$ via the OR gate $45_3$ and the leading edge of the pulse gw resets the first flip-flop circuit $43_{a3}$, and the writing pulse gw through the OR gate 46 resets the three second flip-flop circuits $43_{b1}$, $43_{b2}$ and $43_{b3}$. The flip-flop circuit $43_{a1}$ holding the picture signal No. 61, corresponding to the latch circuit $26_{a1}$, is not reset yet.

From the above description, it is readily understood that the picture signals latched in the latch circuits $36_a$-$1$-$26_{a3}$ are controlled by the queue control circuits $43_1$, $43_2$ and $43_3$ and the counter $33a$ so as to be sent to the memory 3 in order of being latched.

Figure 6:
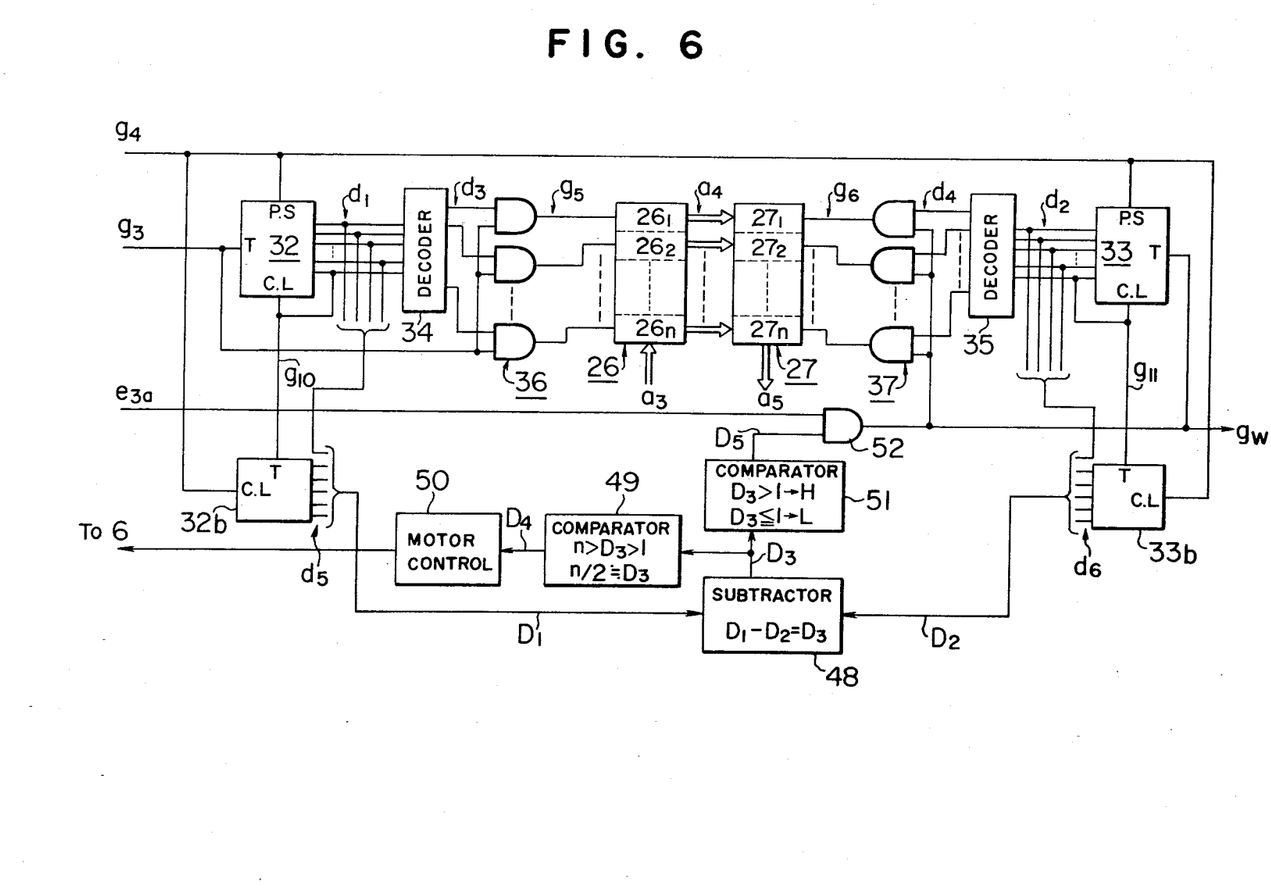
FIG. 6 is a schematic view of still another embodiment of a writing timing control circuit of FIG. 3, having a speed adjusting means.

In FIG. 6 there is shown still another embodiment of the writing timing control circuit 20 in FIG. 3, having a speed adjusting means.

In the speed adjusting means, the total numbers $D_1$ and $D_2$ of the picture signals $a_3$ and $a_5$ which are written in the latch circuits $26_1$-$26_n$ of the register 26 and are read out of the data switch citcuits $27_1$-$27_n$ of the data selector 27 are compared to obtain the difference number $D_3 = D_1 - D_2$ corresponding to the picture signals which have never been read out, and according to the difference number $D_3$ the scanning speed of the original picture is controlled so that the difference number $D_3$ may be maintained at a certain value, thereby controlling the counting speed of the counter 32 of the clock pulses $g_3$.

A pair of counters $32b$ and $33b$ are arranged in parallel with the counters 32 and 33. Each counter $32b$ or $33b$ counts clear pulses $g_{10}$ or $g_{11}$ of the uppermost figure of the counted codes $d_1$ or $d_2$, for clearing the counter 32 or 33, to output a count code $d_5$ or $d_6$. The codes $d_1$ and $d_2$ and the code $d_5$ and $d_6$ are arranged in parallel to obtain total number codes corresponding to the total numbers $D_1$ and $D_2$. The total number codes are fed to a subtractor 48.

The total number $D_1$ and $D_2$ are counted by the counters 32, $32b$, 33 and $33b$ from the time the start pulse $g_4$ is supplied. The counters 32 and 33 are preset to n/2 and 0 by the start pulse $g_4$ and thus the counters 32 and 33 start to count from n/2 and 0. The counters $32b$ and $33b$ are reset to zero per one scanning line in the direction of the cylinder's periphery by the start pulse $g_4$.

The subtracter 48 subtracts the total number $D_2$ of the signal $a_3$ from the total number $D_1$ of the signal $a_5$ to obtain the difference number $D_3$ which is sent to a first comparator 49. The first comparator 49 discriminates whether the difference number $D_3$ is decreasing or increasing on the basis of the number n/2, and outputs a discrimination signal $D_4$ to a motor control circuit 50 which controls the rotation speed of the motor 6 for driving the picture cylinder 4 according to the discrimination signal $D_4$ so that the difference number $D_3$ may always be n/2.

The first comparator 49 may include a D/A converter and outputs an analog discrimination signal $D_4$. Alternatively, the first comparator may use a digital magnitude comparator and outputs a binary discrimination signal $D_4$.

The difference number $D_3$ is sent to a second comparator 51 which discriminates whether the picture signals which have never been read out are exhausted or fewer. For example, the second comparator 51 comprises a magnitude comparator which outputs a signal $D_5$ in high level H or low level L when $D_3 > 1$ or $D_3 \leq 1$. By the output signal $D_5$ the input circuit of the clock pulse $e_{3a}$ is opened or closed via an AND gate 52.

That is, when the difference number $D_3$ is at most one (actually one), the clock pulse $e_{3a}$ to be fed to the counter 33 and the AND gates 37 is skipped by closing the AND gate 52, in the similar manner to the previous embodiment in the period $P_2$. Therefore, the count number of the counter 32 goes always forward more than that of the counter 33, and the difference number $D_3$ is not reduced less than one while the difference number $D_3$ is always supplemented.

In this embodiment, the clock pulse $e_{3a}$ through the AND gate 52 is used as the writing pulse gw.

The first comparator 49 or the second comparator 51 may be omitted in the embodiment in FIG. 6. For example, when only the second comparator is used, it is sufficient to settle the preset valve of the counter 32 to a certain value which is at least one number larger than that of the counter 33. In this embodiment, the latch circuits $26_1$-$26_n$ for holding the picture signals which have never been read out may be reduced and the other members may also be reduced, as compared with the embodiment in FIG. 3 wherein at the starting time the counter 32 is counted to a certain number in advance.

The motor control circuit 50 may control the motor 7 for driving the recording cylinder 5, or another relative speed variation means which adjust a slight amount of relative speeds of the picture and the recording cylinders by using the discrimination signal $D_4$ output from the first comparator 49. Even if the relative speed control described above is carried out, it is impossible to reduce the relative speed deviation to nought, and thus the minimum number of latch circuits are required to deal with the relative speed deviation.

In the above embodiments, the explanation has been performed by using the two-phase clock pulse $e_{3a}$ for the original picture A, but, of course, the other two-phase clock pulse $e_{3b}$ may be used for the original picture B in the same manner as the clock pulse $e_{3a}$.

Although the present invention has been described with reference to preferred embodiments thereof, however, various changes and modifications can be made by those skilled in the art without departing from the scope of the present invention.

What is claimed is:

1. A method for controlling writing timings of each of a plurality of picture signals to be written into and stored in a memory, said signals to be used in a picture reproducing machine wherein the picture signals picked up by picture scanning means are stored in the memory and then the picture signals are read out of the memory, and wherein reproduction pictures are recorded on a recording film by a reproduction recording means by using the picture signals read out, comprising the steps of:
   (a) latching a plurality of the picture signals consecutively into a plurality of data storage latch circuits pre-positioned prior to the memory by a first clock pulse generated by the picture scanning means; and
   (b) writing into the memory each of the scanned picture signals read out of the latch circuits in the latching order by a timing control circuit processing a signal from a second clock pulse generated by the reproduction recording means and a pulse indicating latching of the next consecutive picture signal into one of said data storage circuits.

2. A method as defined in claim 1, wherein the first and second clock pulses are synchronized with the speeds of the picture and recording cylinders, respectively, in the direction of each cylinder's rotation, first and second clock pulses are counted to determine a set of sums, and then the relative speeds of the picture and recording cylinders are controlled so that the difference between the sums is always less than a certain value.

3. A method as defined in claim 2 wherein the phases of the first and second clock pulses are compared and when the phase of the second clock pulse equals or exceeds that of the first clock pulse, the picture signal latched in the latch circuit is read out by the next second clock pulse relative to said compared, second clock pulse, and when the phase of the compared, second clock pulse is less than that of the first clock pulse, the picture signal latched in the latch circuit is read out by the second clock pulse.

4. A method as defined in claim 2, wherein depending on the difference between the count numbers of the first and second clock pulses, the speed of the picture cylinder in the direction of the cylinder's periphery is controlled so that the difference may be less than a certain value.

5. A method as defined in claim 2, wherein depending on the difference between the count numbers of the first and second clock pulses, the speed of the recording cylinder in the direction of the cylinder's periphery is controlled so that the difference may be less than a certain value.

* * * * *